United States Patent [19]

Vahle

[11] 3,909,083

[45] Sept. 30, 1975

[54] UNITARY HEAT-SENSITIVE STRUCTURES

[75] Inventor: Klaus-Heinrich Vahle, Bad Oeynhausen, Germany

[73] Assignee: Eisenwerk Weserhutte A.G., Germany

[22] Filed: May 30, 1973

[21] Appl. No.: 365,235

Related U.S. Application Data

[63] Continuation-in-part of Ser. No. 204,345, Dec. 12, 1971, abandoned.

[52] U.S. Cl. .............................. 308/20; 308/189 R
[51] Int. Cl.² ........................................ F16C 13/00
[58] Field of Search .......... 308/20, 189; 29/148.4 A

[56] References Cited
UNITED STATES PATENTS

| | | | |
|---|---|---|---|
| 1,418,152 | 5/1922 | Logan | 308/20 |
| 2,743,970 | 4/1956 | Cornelius | 308/179 |
| 3,732,606 | 5/1973 | DeGermond | 29/148.4 A |

OTHER PUBLICATIONS

One-shot Rigid Urethane Foam . . . Properties, published in Plastic Technology, dated Aug. 1964, pp. 38–41.

*Primary Examiner*—M. Henson Wood, Jr.
*Assistant Examiner*—Gene A. Church
*Attorney, Agent, or Firm*—James E. Bryan

[57] ABSTRACT

A method of making a unitary structure, such as, a conveyor idler, having a heat-sensitive subassembly with at least one moving part therein, such as, a lifetime lubricated bearing structure, wherein the subassembly is preassembled, the preassembled subassembly is placed in a mold, and a plastic, having a sufficiently low temperature of formation to prevent damage to the heat-sensitive subassembly and, upon hardening, a sufficient compressive strength to hold the subassembly together and form a pressure resistant unitary body, such as, a hard polyurethane foam having a compressive strength of at least about 90 kp/mm², is formed about the subassembly. A protective covering, such as, a plastic sleeve, resistant to abrasion, can also be placed in the mold and made to adhere to and surround the outside surface of the unitary plastic body during the formation of the unitary plastic body.

11 Claims, 4 Drawing Figures

UNITARY HEAT-SENSITIVE STRUCTURES

The present application is a Continuation-in-Part of application Ser. No. 204,345, filed Dec. 12, 1971 now abandoned by the present Applicant.

The present invention relates to a process for making unitary structures of heat-sensitive, mechanical structural elements and plastics and the products thereof. More specifically, the present invention relates to a process for making unitary structures of heat-sensitive, mechanical structural elements and hard foam plastics and the products thereof.

The prior art and the present invention will be more fully understood from the following description when read in conjunction with the drawings, wherein.

It has heretofore been known in the art to produce structural elements and structural parts of assemblies from plastics by extrusion, melting or potting, injection molding, foaming or compression of the plastic. It has also been proposed to utilize such plastics forming techniques for embedding units or elements of metals or the like in plastics. However, because of the high temperatures involved, the latter technique has generally been confined to the embodiment of stationary, heat-insensitive elements, such as, fittings, reinforcements, connecting parts, threaded bushings and the like.

It has also been known in the art to produce assemblies of elements or structures having moving parts and components which are heat-sensitive, which, at least in part, contain plastic parts. Such assemblies are normally produced by forming two shell members or halves from plastic, embedding the heat-sensitive elements in the shell members, and, finally, uniting the heat-sensitive elements to the shell members and the shell members to one another by cementing or the like. However, when carrying out such technique, there is a great tendency for the shell members to improperly fit together and to improperly fit the heat-sensitive elements and the multiple operating steps are costly in time and labor.

It has further been known in the art that assemblies, having rotating moving parts and heat-sensitive, lubricated bearings, such as, conveyor idlers, reversing and driving pulleys, rollers and wheels for other purposes, etc., can be formed, at least in part, from plastic materials.

Specifically, conveyor idlers are required for the support of conveyor belts in belt systems.

Figure 1:
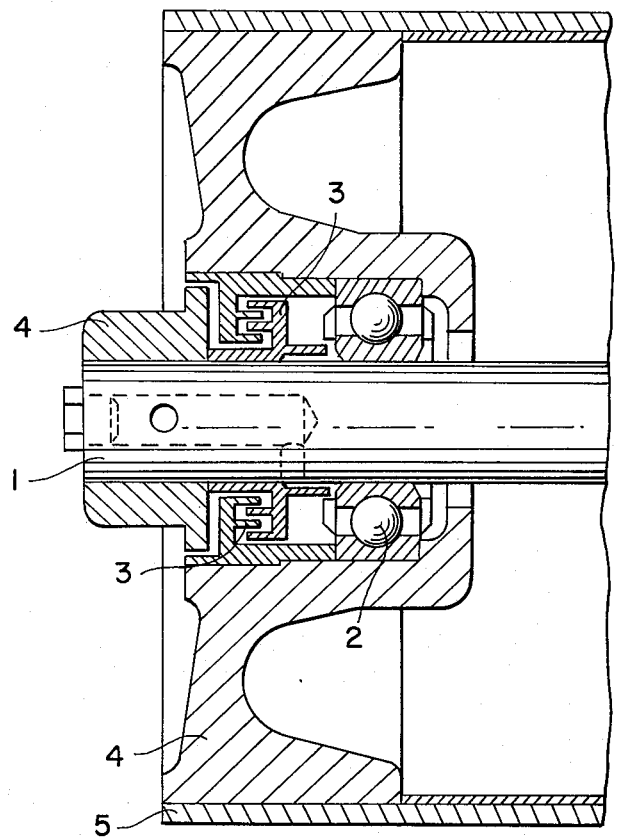
FIG. 1 is a sectional view through an end portion of a conveyor idler of the prior art.

Such a conveyor idler, carrying roller or bearing pulley of the prior art (FIG. 1) generally consists of a stationary axle 1, two roller or ball bearings 2, two labyrinths 3 filled with grease so as to provide a seal against soiling or clogging of the roller or ball bearings, two bottoms 4, and an external pipe 5. Originally, all of these parts consisted originally of steel. The material of the labyrinths was first changed from steel to a plastic for economic reasons.

Thereafter, the use of plastic for bottoms and pipes was tried. This is basically possible. However, the roller bearings and the axle must be made of steel for reasons of stability.

These known systems are proposed to be fabricated by the manufacture of the pipe or tube from plastic, either integrally with the two bottoms or separately in a multiple-part manner, and, specifically, by either rolling or turning the same from small round plastic rods, or by molding, injecting or compressing the plastic in corresponding molds.

In any event, these known solutions are based on the separate manufacture of the tube and the bottom from plastic.

Ultimately, the plastic parts are assembled with the labyrinths as well as with the axle and roller bearings.

It is therefore an object of the present invention to produce unitary structures having at least one moving part and/or at least one component which is heat-sensitive in a manner to reduce the assembly work and the expense thereof.

Another object of the present invention is to produce unitary structures having at least one heat-sensitive component, such as, roller or ball bearings, labyrinth packings, lubricant fillings, etc., in a manner to protect such components from atmospheric contamination or tampering from without.

Still another object of the present invention is to produce unitary structures having a preassembled subassembly containing at least one moving part and/or at least one heat-sensitive component, wherein the subassembly is held together by a plastic body.

The above-mentioned objects and advantages are accomplished in accordance with the present invention by preassembling a heat-sensitive subassembly having at least one moving part therein and thereafter forming a body of a hard plastic, having a sufficiently low temperature of formation to prevent damage to the heat-sensitive subassembly and, which, upon hardening, has a sufficiently high compressive strength to hold the subassembly together and form a pressure-resistant unitary structure.

The term "preassembled subassembly" has reference to heat-sensitive, assembled components having at least one moving part therein and which are to be mounted in a body to form a unitary structure, such as, roller or ball bearings, labyrinth packings, lubricant fillings for lubrication, etc.

The term "hard foam plastic" is meant to connote a hard foam body, for example, hard polyurethane foam, which encloses the components of the preassembled subassembly and holds them together, the hard foam, together with the preassembled subassembly constituting an operational unitary structure, for example, a conveyor idler.

The term "protective covering" is a protective layer which covers the hard foam body, so as to protect it against wear and tear, electrostatic charge, etc. The heat-sensitive, preassembled subassembly could, of course, also include plastic or foam plastic materials, but they are generally other substances, such as, grease fillings for roller or ball bearings and packings or seals for conveyor idlers. The preassembled subassembly is preferably fixed in appropriate foaming molds and then foamed in, or encapsulated, using a foam material, such as, polyurethane hard foam, which has a low reaction temperature. After solidification of the foam, the finished unitary structure is removed from the foaming mold.

One embodiment of the present invention, which is not intended to restrict the invention, will be further described hereinbelow for the manufacture of a conveyor idler with reference to the accompanying FIGS. 2, 3 and 4 of the drawings.

Figure 2:
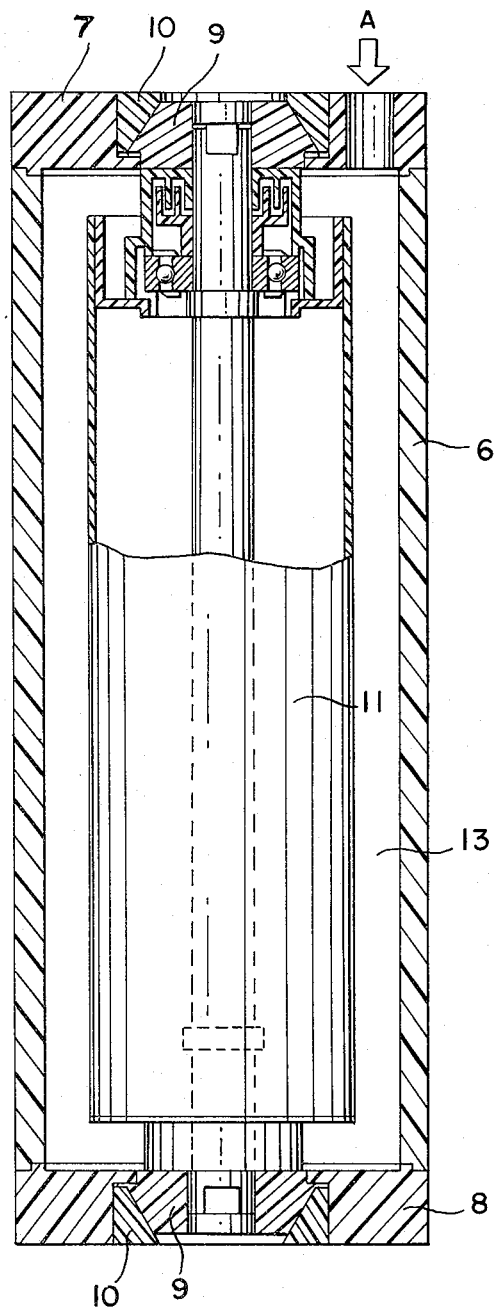
FIG. 2 is a sectional view through a foaming mold and a preassembled, heat-sensitive central portion of a conveyor idler, showing the relation of the two when practicing the process of the present invention.
Figure 3:
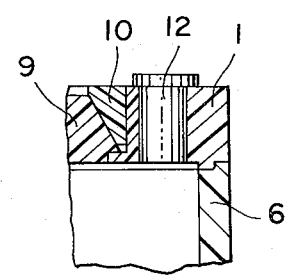
FIG. 3 is a sectional view of a portion of the mold of FIG. 2 with a plug in the filler opening.

Disposed in a foaming mold, as illustrated in FIG. 2, consisting of the mold body 6 with the upper portion 7 as well as the lower portion 8, are mounting supports 9 and 10 serving to receive the completely preassembled subassembly. The filler opening A for the plastic material is closed with a stopper or plug 12, as shown in FIG. 3, whereby a hollow space 13 is formed in conformity with the conveyor idler body.

Figure 4:
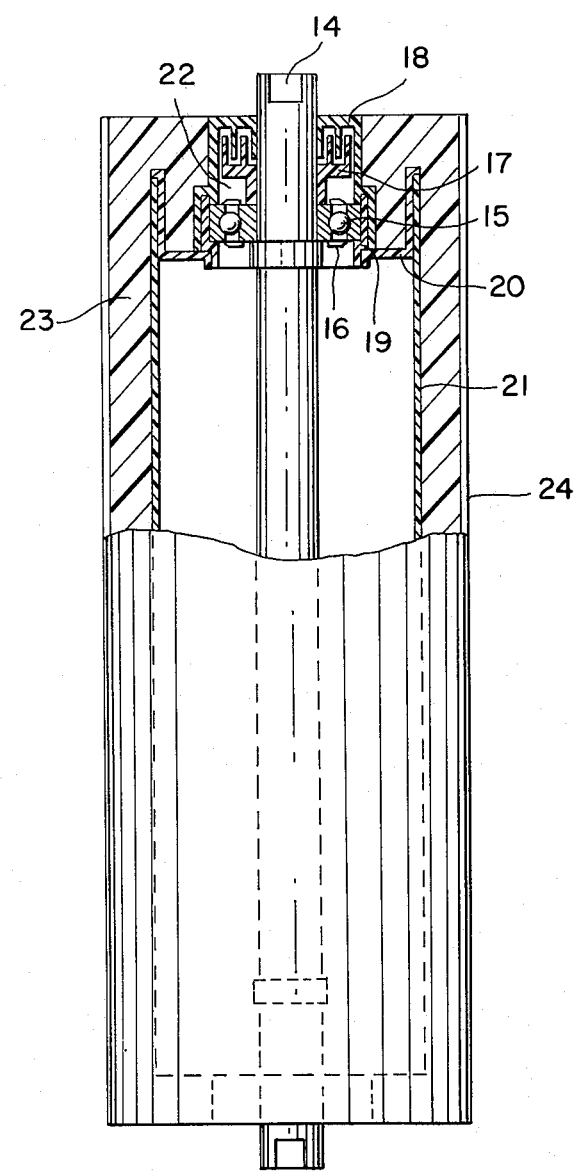
FIG. 4 is a partial sectional view of a unitary conveyor idler made in accordance with the present invention.

FIG. 4 is a partial cross-sectional view through the completely finished conveyor idler.

The completely preassembled subassembly, to be built in, consisting of the axle 14, the bearing 15, the sealing disc 16, the labyrinths 17 and 18, the bearing support 19, the spacer ring 20, the supporting body 21 and the grease or lubricant charge 22 for the roller bearings and labyrinths, is enclosed by the surrounding hard foam body 23 and thereby held together.

The cylindrical bearing or rolling surface of the bearing pulley is suitably provided with a protective coating or layer 24 that is wear-resistant and/or electrically conductive.

In the method of making the unitary structure, as exemplified by a conveyor idler, the axle 14, the bearings 15, the labyrinths 17 and 18, the bearing support 19, the spacer ring 20, the supporting body 21 and the lubricant charge 22 are preassembled as a subassembly. This preassembly can, of course, be accomplished easily and inexpensively.

This preassembled subassembly is then placed in a mold (FIG. 2) and surrounded with plastic foam, at which time the axle and the labyrinths are covered with a thin cardboard or plastic tube 11.

Instead of using plastic foam, the mold could also be filled with non-porous plastic. This solution, however, is too expensive and too difficult.

On the other hand, not any plastic foam can be used. It must be hard foam for reasons of stability or solidity.

For purposes of production of the foam for the idler, the plastic components are accurately dosed, mixed in a stirring apparatus, and then filled from above through the opening A into the hollow space 13; at that time the hollow space is initially only partially filled. Thereafter, the opening A is closed with the stopper 12. After about half a minute, the plastic mixture begins to foam, thereupon completely filling the hollow space, and will subsequently solidify.

When the foaming operation is complete, the idler is completely finished. The difficult operation of assembling the labyrinths and roller bearings in the roller bottom and, respectively, roller body is thus obviated.

Thus, according to the invention, heat-sensitive, completely preassembled structural elements (roller bearings, labyrinths, lubricant fillings, etc.) are foamed into hard foam plastic to produce a unitary structure ready to be used.

Only those hard foams which do not have too high a foaming temperature can be used.

In case foaming is carried out at foaming temperatures which are too high, the lubricant filling in the seals and bearings would run out since they are sensitive to heat. Too high a foaming temperature is also disadvantageous for the roller bearings.

For this reason it is necessary to make use of a hard foam which has a low foaming temperature in order to prevent the lubricants from running out and so as not to damage the roller bearings by too high a temperature.

The basic materials for a preferred polyurethane foam are polyols and isocyanates. The polyols may be used in the form of polyethers or polyesters, or as a combination of these two, depending upon the properties being desired. See "Polyurethanes," by Bernard A. Dombrow, Reinhold Publishing Co., 1957.

The finished hard foam should have a minimal compression strength of at least about 90 kp/mm$^2$.

Other hard foam materials or substances may also be employed if the required conditions, such as, a low foaming temperature and a minimal resistance to pressure of 90 kp/mm$^2$, are met.

A particularly useful hard foam is "Hartmoltopren" manufactured by Bayer. Data on this material may be found in a Bayer brochure entitled "Hartmoltopren," order No. DD 5636 D 18 - 619/65 821, dated Mar. 1, 1968.

As previously indicated, the particular value of the polyurethane hard foam or of a similar material is that a material having a relatively low manufacturing temperature (foaming temperature) has been developed. This becomes important when there are structural elements which, because of their composition and because of the substances that may possibly be employed in these structural elements (for example, lubricants), are heat-sensitive.

Polyurethane hard foam is resistant against water, sea water, dilulted acids and alkalies, gasoline, mineral oil, and many other chemicals.

Since hard foam plastic material is produced at low temperatures and, after hardening, becomes very resistant to pressure, the finished preassembled structural elements are not subjected to any changes due to heat, and the structural element with the surrounding foamed plastic constitutes a unitary article ready for use and also a unitary structure ready for use. A particular advantage of the present invention is that the substances forming a necessary part of the preassembled structural element, for example, lubricating grease and the like, are completely screened or sealed off from the surrounding environment and moreover are inaccessible to any influences from the outside.

The low density and the properties of mechanical resistance of the inventive products make it possible to manufacture, for example, finished and installation-ready units and machine parts or elements with roller bearings and other rotary parts, which are lubricated without maintenance for the duration of the service life thereof, and in which the hard foam plastic material is provided as the supporting structure which holds the structural elements together so as to form a unitary structure that is ready for use.

Furthermore, it is also possible to provide the outer surfaces of the foam structure with a protective coating at the time of manufacture thereof, for example, with a protective coating against abrasion.

While a homogeneous marginal zone can be produced when the polyurethane foam hardens, this coating is not very suitable for the purpose of preventing abrasion, and, accordingly, an outer skin of abrasion-resistant material must be provided for.

In the present case, for example, a plastic hose from "Caprolan TN 65," manufactured by National Aniline Div. of Allied Chemical and Dye, is used. This material is generally described as a polycapramide nylon. It consists of a thermoplastically workable, or treatable, polyurethane elastomer and has excellent properties as far as wear and tear are concerned.

It is also possible to make use of a sheathing from rubber, cellular polyurethane elastomer, PVC, or PA.

In addition to these properties of resistance to wear and tear, other properties which may be required, in connection with the outer skin, are, for example, electric conductivity, in order to prevent electrostatic charges, or properties which prevent baking-on, in case sticky materials are being conveyed.

The sheathing or hose is inserted in the foaming mold in the form of a tube or a hose and, when foaming out, combines with or becomes bonded to the hard foam body, thus firmly adhering thereto.

As has been indicated, it is the object of the invention to embed heat-sensitive, completely preassembled structural elements so that they are undetachably held by the plastic foam and in this manner form a structural unit ready for use.

Such a provision has, among others, the advantages that the completely preassembled structural elements do not undergo any changes due to heat, and that the structural element will constitute a unitary body and construction ready for use with the surrounding foamed plastic. An additional advantage is that substances required in the respective structural element (for example, lubricants and the like) are completely screened off from the surrounding atmosphere and render tampering from without quite impossible. Thus, the low volumetric weight and the mechanical properties of solidity or rigidity allow the manufacture of finished and ready-for-assembly units and machine parts with roller bearings and other rotating parts which are lubricated without maintenance for the duration of the service life thereof, and in which the foamed plastic is provided as a structure that is able to support loads and hold the whole structure together to form a unitary structure ready for use.

Because of the substantial simplification in the manufacture and by largely eliminating mechanical assembly, these measures render it possible to make unitary structures from hard foam plastic material and heat-sensitive structural elements more expediently and, thus, more economically than has been possible heretofore.

It will be obvious to those skilled in the art that many modifications may be made within the scope of the present invention without departing from the spirit thereof, and the invention includes all such modifications.

What is claimed is:

1. A structure for a conveyor idler, a reversing pulley, a driving pulley, a roller, a wheel for other purposes and the like, comprising; a preassembled subassembly including at least one movable part and at least one heat-sensitive element and a unitary body of a hard foam plastic, having a sufficiently low temperature of formation to prevent damage to said heat-sensitive element and a sufficiently high compressive strength to hold said subassembly together as a rigid, unyielding, finished structure when hardened, formed about said subassembly in a manner to hold said subassembly together and protect said subassembly from outside influences.

2. A structure in accordance with claim 1 wherein the hard foam plastic is polyurethane foam.

3. A structure in accordance with claim 1 wherein the moving part is a rotatable member.

4. A structure in accordance with claim 3 wherein the rotatable member includes a roller bearing.

5. A structure in accordance with claim 1 wherein the heat-sensitive subassembly includes a body of lubricant.

6. A structure in accordance with claim 5 wherein the heat-sensitive subassembly includes at least one lubricant seal.

7. A structure in accordance with claim 1 wherein the unitary structure is a conveyor idler.

8. A structure in accordance with claim 1 wherein the exterior of the plastic unitary body has a protective covering about its outer surface.

9. A structure in accordance with claim 8 wherein the covering is a plastic sleeve.

10. A structure in accordance with claim 8 wherein the covering is abrasion-resistant.

11. A structure in accordance with claim 4 wherein the subassembly includes a rotatable shaft operatively associated with the bearing.

* * * * *